United States Patent Office.

GEORGE WILLIAM UPHAM, OF AMHERST, NEW HAMPSHIRE.

Letters Patent No. 82,454, dated September 22, 1868.

IMPROVED CEMENT.

*The Schedule referred to in these Letters Patent and making part of the same.*

TO ALL WHOM IT MAY CONCERN:

Be it known that I, GEORGE WILLIAM UPHAM, of Amherst, in the county of Hillsborough, and State of New Hampshire, have invented a certain new and useful Cement; and I do hereby declare that the following is a full, clear, and exact description thereof, reference being had to the accompanying drawings, and to the letters of reference marked thereon, which form a part of this specification.

The object of my invention is to provide a suitable and effective cement, for the purpose of mending or holding the broken pieces of earthen or glass vessels together; and my cement is made of the following ingredients, which are compounded or mixed in the proportions, or thereabouts, hereinafter described.

In making my cement, I take one pound of shellac, two ounces sulphur, and one ounce resin, and place them in a pot or other vessel of boiling water, and thoroughly stir or mix them. The cement, or the ingredients composing it, while thus undergoing the above-named process, will mix together in a separate body from the water. When the cement is in this state, take it out of the pot and work it thoroughly by pulling or drawing it, the same as you would in making taffy. If, after taking it from the pot, it should become brittle, replace it in the pot, and again thoroughly mix it, and, while hot and soft, form it into rolls by rolling it between two hard, smooth substances.

To use my cement, heat the article sufficiently hot to cause the cement, when rubbed against the broken edges of the article to be mended, to melt and adhere thereto; then press the edges, covered with the cement, while in a soft state, firmly together, and when cool, the article can be used as before.

What I claim, and desire to secure by Letters Patent, is—

The within-described cement, composed of the ingredients herein named, and compounded in or about the proportions set forth.

In testimony that I claim the foregoing as my own, I affix my signature in presence of two witnesses.

GEO. WM. UPHAM.

Witnesses:
    LEVI McCONIHE,
    F. E. RUSSELL.